March 23, 1948.

H. KONET 2,438,406

VANE TYPE TRANSMITTER

Filed Dec. 16, 1943

INVENTOR.
Henry Konet
BY
Herbert M. Birch
ATTORNEY

Patented Mar. 23, 1948

2,438,406

UNITED STATES PATENT OFFICE 2,438,406

VANE TYPE TRANSMITTER

Henry Konet, Paramus, N. J., assignor to Bendix Aviation Corporation, Teterboro, N. J., a corporation of Delaware Application December 16, 1943, Serial No. 514,523

5 Claims. (Cl. 177—380)

The present invention relates to electrical transmitters and particularly to an improved transmitter for indicating and/or reproducing angular movements of sensitive devices, such as gyroscopes or the like.

An object of the present invention is to provide a novel improvement in transmitters for a telemetric system.

Another object is to provide in a novel transmitter for reproducing indications of angular position, a novelly arranged inductance bridge circuit, whereby upon angular displacement of a rotor means of novel cooperative structure the inductance bridge is unbalanced to transmit an electrical signal.

Another object is to provide a novel transmitter for telemetric systems adapted for reproducing angular movement to regulate the attitude of an aircraft in cooperation with automatic pilot control systems.

Another object is to provide a novel transmitter having a novelly designed rotor responsive to angular movements derived from a condition responsive means, in combination with a bridge circuit adapted to be unbalanced to generate a positive signal or a negative signal in response to clockwise or counterclockwise movements respectively, of the rotor from a circuit balance position in proportion to the angular positions of a craft indicator device.

Yet another object is to provide a novel signal transmitter designed for simplicity and material weight reduction to thereby provide particular utility in automatic pilot systems.

The above and other objects and advantages of the present invention will appear more fully hereinafter from a consideration of the detailed description which follows, taken together with the accompanying drawings wherein two embodiments of the invention are illustrated. It is to be expressly understood, however, that the drawings are for the purpose of illustration only and are not designed as a definition of the limits of the invention. Reference for this latter purpose should be had to the appended claims.

Figure 1:
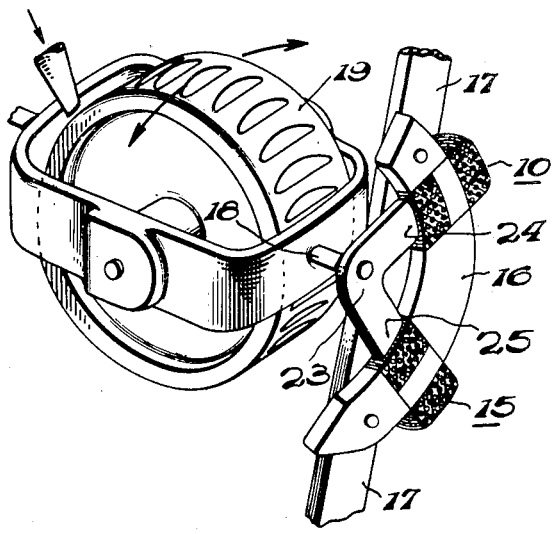

In the drawings, wherein like reference characters refer to like parts throughout the several views, Figure 1 is a perspective view of the present invention associated with a gyroscope.

Figure 2:
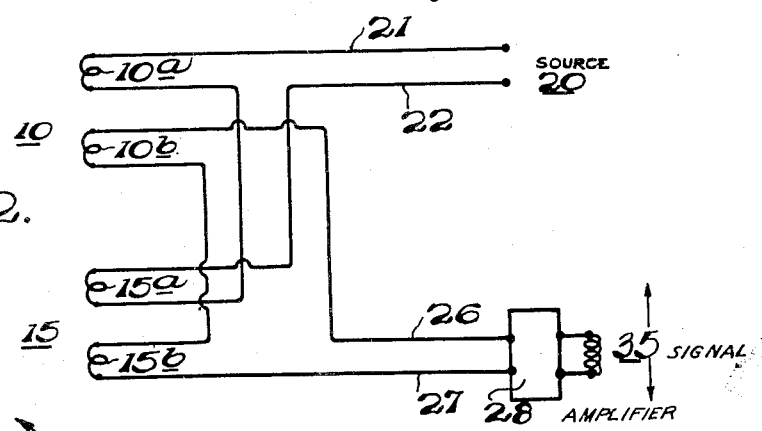
Figure 3:
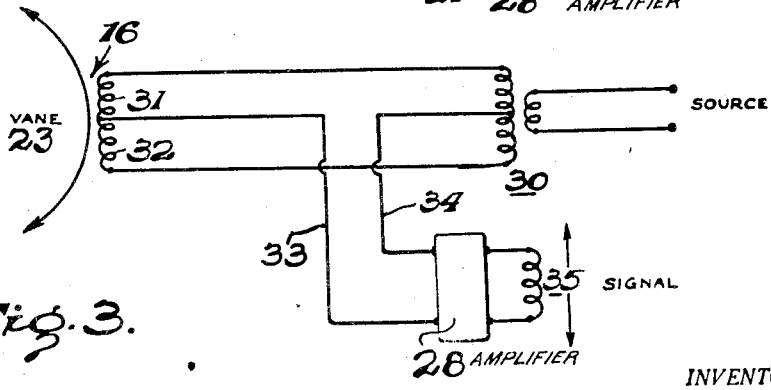

Figure 2 is a diagrammatic view of one circuit arrangement for the present invention, and Figure 3 is a diagrammatic view of another embodiment of the circuit arrangement.

Referring in detail to the several views in the drawings, the novel transmitter comprises a stator having two transformers or symmetrically placed field windings 10 and 15, which include primary or exciter coils 10a, 15a and secondary or inductance coils 10b, 15b, oppositely wound with respect to coils 10a and 15a on a stator in the form of an arcuate core segment or bar 16 secured to a suitable frame, such as 17 affixed to the mobile object upon which the entire arrangement is mounted.

Arcuate core bar 16 and its frame 17 are mounted adjacent shaft 18, which may constitute the take-off axis of a gyro-responsive mass or means 19, as shown in Figure 1.

The coils 10a, and 15a are connected to a source of power 20 through leads 21 and 22, so as to induce voltage in coils 10b and 15b and to thereby provide a normally balanced inductance bridge circuit. That is, in the balanced position, equal voltages are induced in the secondary or induction coils 10b and 15b so that the magnetic circuits or flux lines about the coils 10b and 15b are symmetrical, and being connected in opposition, no signal is obtained.

Shaft 18 extends adjacent the arcuate core bar 16 or at the axial center thereof in a plane transverse with respect thereto and has secured thereon a rotor member 23, such as a V-shaped vane construction, which includes arms 24 and 25 diverging radially outward to a point in alignment with and adjacent transformers 10 and 15 in the balanced position, so as to define air gaps there-between.

In Figure 2 is illustrated diagrammatically one form of circuit. The detailed arrangement of the transformers 10 and 15 is here shown as comprising a pair of series connected primary windings or exciter coils 10a and 15a across from a pair of secondary windings or inductance coils 10b and 15b connected in series opposed relation to each other. The primary coils 10a and 15a are connected through leads 21 and 22 to a source of power 20, to thereby introduce current by induction into the magnetic circuits about coils 10b and 15b, which are connected to any suitable repeater means or amplifier by conductor leads 26 and 27. Where a signaling mechanism is required to transmit an angular motion, i. e., displacement, specifically as in regard to a gyro axis for control of pitch or bank on an aircraft or otherwise, the mechanism herein described affords the advantages of simplicity and reduced weight.

The foregoing arrangement is such, that while rotor 23 is in balanced position with vane arms 24 and 25 in alignment with the transformers 10 and 15, the current in the respective primary or exciter windings, 10a and 15a, produces magnetic flux lines through each rotor arm and about each inductance coil 10b and 15b, which are symmetrical and balanced equal voltages are induced in the inductance coils 10b and 15b. Since inductance coils 10b and 15b are wound and connected in opposition, in the balanced position, the magnetic circuits about coils 10a and 15a are symmetric and equal voltages are induced in the coils 10b and 15b, and no signal is produced. However, upon displacement of rotor vane 23, with vane arms 24 and 25, clockwise on shaft 18 in response to a corresponding angular variation of the gyroscope 19, a shift in the magnetic fields associated with each arm and coil associated therewith from their symmetrical relation produces an increase of coupling in coils 15b and a decrease in coil 10b, that is, a greater average voltage in either coil 10b or 15b and a decrease in the coils 10a and 15a according to the direction of such angular variation. For example, assume that the magnetic field is disturbed by a clockwise rotation, movement or displacement of the rotor member or vane 23 so as to produce an increase of coupling in coils 15a and 15b and a decrease of coupling in coils 10a and 10b, to provide coil 15b with a higher average voltage than is induced in inductance coil 10b, then an instantaneous positive signal is transmitted through conductors 26 and 27 by coil 15b, to any suitable repeater such as in amplifier 28 and coil 25, the same as shown in Figure 3. That is, a signal results in a positive instantaneous direction.

The operation reverses upon displacement of rotor vane 23 in the opposite direction and a negative instantaneous signal is transmitted by inductance coil 10b through conductors 26 and 27 to a suitable repeater as described above. That is, counter-clockwise rotation, movement or displacement of the rotor member or vane 23 reverses the phenomenon and a negative instantaneous direction of voltage signals is produced. Suitably amplified as shown in Figures 2 and 3, this signal may be used for various purposes so as to control the attitude of an airplane as an automatic pilot or otherwise.

In Figure 3 is shown an embodiment of the invention utilizing another circuit arrangement wherein an amplifier 28 of any suitable type is employed to step up the power of the signal transmitted, so that the signal may be used to control the attitude of an airplane or the like, as a part of an automatic pilot system or the like.

In the circuit of Figure 3, the operation is substantially the same as in Figure 2, but a separate transformer 30 is used to induce voltage in coils 31 and 32, which form the induction bridge. Any displacement of the vane or rotor 23 with respect to the stator or arcuate core segment or bar 16 from balance position clockwise or counterclockwise increases or decreases the voltage in either coil 31 or 32 and a signal of either positive or negative polarity is transmitted through leads 33 and 34, amplifier 28 and coil 35 to a suitable signal or control arrangement the same as in Figure 2 and constitutes any suitable form of repeater for the amplified signal.

There is thus designed a novel transmitter for telemetric transmission or the like, which has utility in connection with systems, such as automatic pilot controls or the like and which is simple to manufacture, extremely light in weight, efficient, rugged and instantaneous in transmitting either negative or positive energy with respect to angular motion of a normally balanced means, so as to indicate and/or reproduce such angular movements to either the negative or positive side of the null or balance position from which indications and/or reproduction of movement are based or control arrangements operated, such as to control the attitude of an airplane etc., as an automatic pilot or otherwise.

While only two embodiments of the invention have been illustrated and described, other changes and modifications, which will now appear to those skilled in the art, may be made without departing from the scope of the present invention. Reference is, therefore, to be had to the appended claims for a definition of the limits of the present invention.

What is claimed is:

1. Means for transmitting signal voltage representative of a condition to a remote control point, comprising a normally energized and balanced bridge circuit including a pair of spaced inductances and a V-shaped rotor vane mounted for rotation opposite said inductances in response to the condition to be transmitted to said remote control point, to thereby vary the value of said inductances whereby said bridge circuit is unbalanced for transmission of a signal voltage corresponding to said condition to said remote control point.

2. In a transmitter for automatic pilot systems or the like, transformer means connected to a source of power including a pair of normally balanced secondary windings, a pair of inductance means connected to said secondaries and normally providing a balanced bridge circuit therewith, means adapted to mount said inductance means in spaced apart relation, a rotor shaft having an end adjacent said inductance means, a V-shaped rotor vane diverging outwardly from said shaft end to thereby define a restricted air gap opposite each of said inductance means, and conductor means tapped off from said secondary windings and said inductance means to a remote control point.

3. Means to transmit negative or positive signals to a remote point comprising a combination with a gyro responsive means having a take-off axis, a concentric arcuate stator suitably supported or fixed to the frame of a part to be controlled and having radially and circumferentially spaced exciter and induction coils, said coils being symmetrically placed and the exciter coils being connected to a source of electrical energy, and a bifurcated rotor fixed to the take-off axis to be actuated thereby in either direction according to the position of the gyro, said exciter coils being connected in series and having leads from the source of energy and said inductance coils being connected in series opposed relation and having output connections, said rotor having its furcations normally aligned with certain of the coils in balanced position with the magnetic circuits about the coils symmetrical and of equal voltage to induce equal voltages in the inductance coils in a null position so that no signal results in the output thereof, and whereby movement of the rotor clockwise produces an unbalance of the magnetic circuits, and results in an increase of coupling in certain opposed coils and a decrease of coupling in the other opposed coils, to produce a signal in a positive instantaneous direction and whereby movement of the rotor counter-clockwise reverse the relative voltages in the respective coils to produce a negative instantaneous direction of voltage signal.

4. An electrical signal pick-off for a gyroscope adapted for motion about a given axis, comprising an arcuate stator fixed concentrically with said axis, means comprising a normally energized and balanced bridge circuit including spaced inductances on said stator, a V-shaped rotor having two diverging arms normally aligned with said inductances whereby said bridge is balanced, and means connecting said rotor to said gyroscope for movement therewith about said axis relative to said stator whereby motion of said rotor arms relative to said inductances unbalances said circuit.

5. An electrical signal pick-off for a gyroscope adapted for motion about a given axis, comprising an arcuate stator fixed concentrically with said axis, means comprising a normally energized and balanced inductance bridge circuit including a pair of spaced series connected energizing windings mounted on said stator and a pair of series opposed connected inductance windings on said stator adjacent said energizing windings, a V-shaped rotor having two diverging arms normally aligned with said spaced windings whereby said bridge is balanced, and means connecting said rotor to said gyroscope for movement therewith about said axis relative to said stator whereby motion of said rotor arms relative to said spaced windings unbalances said circuit.

HENRY KONET.

REFERENCES CITED

The following references are of record in the file of this patent:

UNITED STATES PATENTS

| Number | Name | Date |
| --- | --- | --- |
| 1,578,831 | Keeler | Mar. 30, 1926 |
| 1,921,983 | Wittkuhns | Aug. 8, 1933 |
| 2,139,558 | Moseley | Dec. 6, 1938 |